US008209610B2

(12) United States Patent
Ichioka et al.

(10) Patent No.: US 8,209,610 B2
(45) Date of Patent: Jun. 26, 2012

(54) INFORMATION PROCESSING APPARATUS, INFORMATION PROCESSING METHOD, AND COMPUTER PROGRAM

(75) Inventors: Hidetoshi Ichioka, Tokyo (JP); Hitoshi Kimura, Kanagawa (JP); Kensuke Ohnuma, Tokyo (JP)

(73) Assignee: Sony Corporation (JP)

( * ) Notice: Subject to any disclaimer, the term of this patent is extended or adjusted under 35 U.S.C. 154(b) by 330 days.

(21) Appl. No.: 11/482,009

(22) Filed: Jul. 6, 2006

(65) Prior Publication Data
US 2007/0016931 A1    Jan. 18, 2007

(30) Foreign Application Priority Data
Jul. 6, 2005    (JP) .............................. P2005-197876

(51) Int. Cl.
*G06F 3/00*    (2006.01)
(52) U.S. Cl. ...................... 715/721; 386/297
(58) Field of Classification Search .......... 715/704–705, 715/708, 714, 716–722, 738, 810–811, 855; 386/238, 296–297; 707/736, 748, 752, 753, 707/754
See application file for complete search history.

(56) References Cited

U.S. PATENT DOCUMENTS

| | | | |
|---|---|---|---|
| 6,005,597 A | 12/1999 | Barrett et al. | |
| 7,149,983 B1 * | 12/2006 | Robertson et al. | 715/810 |
| 7,627,824 B2 * | 12/2009 | Segel | 715/721 |
| 2005/0097606 A1 * | 5/2005 | Scott et al. | 725/52 |
| 2006/0206912 A1 * | 9/2006 | Klarfeld et al. | 725/40 |
| 2006/0271958 A1 * | 11/2006 | Ukai et al. | 725/46 |
| 2007/0005655 A1 * | 1/2007 | Takehara et al. | 707/104.1 |

FOREIGN PATENT DOCUMENTS

| | | |
|---|---|---|
| JP | 2000-013708 | 1/2000 |
| JP | 2001069369 A | 3/2001 |
| JP | 2002-112186 | 4/2002 |
| JP | 2003-224798 A | 8/2003 |
| JP | 2004254077 | 9/2004 |
| JP | 2004-357184 A | 12/2004 |
| JP | 2005-056361 A | 3/2005 |
| JP | 2005115790 A | 4/2005 |
| WO | 99/65237 | 12/1999 |

OTHER PUBLICATIONS

European Search Report from corresponding European Application 06 25 3308.8, dated Apr. 22, 2009.
Office Action from Japanese Application No. 2005-197876, dated Mar. 1, 2011.
Office Action from Japanese Application No. 2005-197876, dated Dec. 14, 2010.

* cited by examiner

*Primary Examiner* — Weilun Lo
*Assistant Examiner* — Enrique Iturralde
(74) *Attorney, Agent, or Firm* — Lerner, David, Littenberg, Krumholz & Mentlik, LLP

(57) ABSTRACT

Program viewing is provided so that a user can easily search for a program which the user desires to view. An information processing apparatus includes an EPG information recording unit which stores EPG information of programs; a program selection unit which selects programs corresponding to a plurality of different selection conditions based on the EPG information; and a display control unit which controls the display on a display screen of a plurality of selection buttons associated with the plurality of selection conditions in a manner that features of the selected programs are represented, wherein, when any one of the selection buttons is selected, the display control unit controls the display on the display screen of information corresponding to the program associated with the selected selection buttons.

17 Claims, 14 Drawing Sheets

FIG. 4

RECORDED PROGRAM INFORMATION STORAGE UNIT 138

| ATTRIBUTE | CONTENTS |
|---|---|
| RECORDED PROGRAM ID | 00001R |
| BROADCAST STARTING DATE AND TIME | 2005/6/22 22:00:00 |
| BROADCAST ENDING DATE AND TIME | 2005/6/22 23:30:00 |
| VIEWING SITUATION | NOT VIEWED |
| BROADCAST STATION | TELEVI-JAPAN |
| CHANNEL | 5 |
| GENRE | NEWS |
| TITLE | NEWS 22 |
| CONTENTS | XXX |

FIG. 5

BROADCAST PROGRAM INFORMATION STORAGE UNIT 140

| ATTRIBUTE | CONTENTS |
|---|---|
| BROADCAST PROGRAM ID | 00001A |
| BROADCAST STARTING DATE AND TIME | 2005/6/24 22:00:00 |
| BROADCAST ENDING DATE AND TIME | 2005/6/24 23:30:00 |
| BROADCAST STATION | TELEVI-JAPAN |
| CHANNEL | 5 |
| GENRE | NEWS |
| TITLE | NEWS 22 |
| CONTENTS | YYY |

FIG. 6

PREFERENCE INFORMATION STORAGE UNIT 142

| PREFERENCE INFORMATION TYPE |
|---|
| TITLE KEYWORD PREFERENCE INFORMATION |
| KEYWORD PREFERENCE INFORMATION |
| GENRE PREFERENCE INFORMATION |
| CHANNEL DAY TIME RANGE PREFERENCE INFORMATION |

242 — TITLE KEYWORD PREFERENCE INFORMATION
244 — KEYWORD PREFERENCE INFORMATION
246 — GENRE PREFERENCE INFORMATION
248 — CHANNEL DAY TIME RANGE PREFERENCE INFORMATION

| TITLE KEYWORD | PREFERENCE DEGREE |
|---|---|
| NEWS | 15 |
| 22 | 8 |
| SPECIAL | 9 |
| GETTING OFF ON THE WAY | 3 |
| ANIMALS | 5 |
| TRAVEL | 2 |
| ⋮ | ⋮ |

| GENRE | PREFERENCE DEGREE |
|---|---|
| NEWS | 20 |
| DRAMA | 7 |
| SPORTS | 13 |
| MOVIE | 5 |
| QUIZ | 3 |
| DOCUMENTARY | 8 |
| ⋮ | ⋮ |

| KEYWORD | PREFERENCE DEGREE |
|---|---|
| FUJII NAOTO | 14 |
| FOOTBALL | 6 |
| SUSPENSE | 9 |
| ⋮ | ⋮ |

| CHANNEL, DAY, TIME RANGE | PREFERENCE DEGREE |
|---|---|
| CH-8 WEDNESDAY 21:00 | 12 |
| CH-4 SUNDAY 19:00 | 9 |
| ⋮ | ⋮ |

VIEWING HISTORY INFORMATION STORAGE UNIT 144

| PROGRAM ID | TITLE |
|---|---|
| 00001A | NEWS 22 |
| 00235A | MONDAY SUSPENSE |
| 00001R | NEWS 22 |
| 11255A | ITO FAMILY |

262     264

FIG. 12
VIEWING TIME TABLE 270

| PROGRAM ID (272) | BROADCAST TIME INTERVAL (MIN.) (274) | PROGRAM ID TOTAL VIEWING TIME (MIN.) (276) |
|---|---|---|
| 00001A | 90 | 90 |
| 00012R | 60 | 30 |
| 00555A | 15 | 5 |
| 00654R | 30 | 120 |
| 03123R | 30 | 95 |
| 12345R | 60 | 365 |
| ⋮ | ⋮ | ⋮ |

FIG. 13

| VIEWING STYLE | DESCRIPTION | ALLOCATED PROGRAMS |
|---|---|---|
| Hot | RECENT NEW INFORMATION PROGRAM | NEWS GENRE OR SPORTS GENRE, RECENT PROGRAM OR TO-BE-RELEASED PROGRAM |
| Link | SIMILAR PROGRAM | PROGRAM IN THE SAME GENRE HAVING A PROGRAM NAME INCLUDING KEYWORDS THE SAME AS THOSE OF THE CURRENTLY VIEWED PROGRAM |
| New | FREQUENTLY VIEWED PROGRAM, BUT NOT VIEWED PROGRAM | PROGRAM HAVING A PREFERENCE DEGREE WHICH IS MORE THAN AN AVERAGE VALUE DUE TO VIEWING OF NOT VIEWED PROGRAMS |
| Past | VIEWED HISTORY PROGRAM | CONTENTS HAVING A 1-MINUTE OR MORE VIEWED HISTORY |
| Best | FAVORITE PROGRAM | PROGRAM OF A HIGH PREFERENCE DEGREE |
| Freq | LONG-TIME VIEWED PROGRAM | RECORDED PROGRAM HAVING A LONG "TOTAL VIEWING TIME/BROADCAST TIME INTERVAL" |
| Shelf | PREVIOUSLY RECORDED PROGRAM THAT REMAINS IN ONE'S MEMORY | SELECT AT RANDOM OLD ONES AMONG RECORDED PROGRAMS |

FIG. 14

| VIEWING STYLE | SEARCH KEY | DATABASE USED FOR SEARCH |
|---|---|---|
| Hot | GENRE, BROADCAST STARTING DATE AND TIME | BROADCAST PROGRAM INFORMATION STORAGE UNIT, RECORDED PROGRAM INFORMATION STORAGE UNIT |
| Link | TITLE, GENRE | BROADCAST PROGRAM INFORMATION STORAGE UNIT, RECORDED PROGRAM INFORMATION STORAGE UNIT |
| New | PREFERENCE DEGREE, VIEWING HISTORY | PREFERENCE INFORMATION STORAGE UNIT, BROADCAST PROGRAM INFORMATION STORAGE UNIT, RECORDED PROGRAM INFORMATION STORAGE UNIT, VIEWING HISTORY INFORMATION STORAGE UNIT |
| Past | | VIEWING HISTORY INFORMATION STORAGE UNIT |
| Best | PREFERENCE DEGREE | PREFERENCE INFORMATION STORAGE UNIT, BROADCAST PROGRAM INFORMATION STORAGE UNIT, RECORDED PROGRAM INFORMATION STORAGE UNIT |
| Freq | VIEWING TIME, BROADCAST TIME INTERVAL | VIEWING HISTORY INFORMATION STORAGE UNIT |
| Shelf | BROADCAST STARTING DATE AND TIME | RECORDED PROGRAM INFORMATION STORAGE UNIT |

FIG. 15

"HOT" PROGRAM LIST

| RANK (302) | PROGRAM ID (304) | CHANNEL (306) | BROADCAST STARTING DATE AND TIME (308) | TITLE (310) |
|---|---|---|---|---|
| 1 | 00001A | 5 | 2005/6/24 22:00:00 | NEWS 22 |
| 2 | 00035A | 9 | 2005/6/24 21:30:00 | TODAY'S NEWS |
| 3 | 00856A | 11 | 2005/6/24 22:30:00 | NEWS NETWORK |
| 4 | 11222A | 2 | 2005/6/24 22:40:00 | NEWS TOKYO |
| 5 | 00078R | 43 | 2005/6/24 18:30:00 | NEWS FOREST |
| 6 | 00010R | 5 | 2005/6/24 12:00:00 | FOOTBALL, JAPAN VS MEXICO |

FIG. 16

"LINK" PROGRAM LIST

| RANK 302 | PROGRAM ID 304 | CHANNEL 306 | BROADCAST STARTING DATE AND TIME 308 | TITLE 310 |
|---|---|---|---|---|
| 1 | 00020A | 5 | 2005/6/24 21:00:00 | FRIDAY DRAMA XX, EPISODE 5 |
| 2 | 00250R | 5 | 2005/6/17 21:00:00 | FRIDAY DRAMA XX, EPISODE 4 |
| 3 | 00130R | 5 | 2005/6/10 21:00:00 | FRIDAY DRAMA XX, EPISODE 3 |
| 4 | 00075R | 2 | 2005/6/3 21:00:00 | FRIDAY DRAMA XX, EPISODE 2 |
| 5 | 00053R | 43 | 2005/5/27 21:00:00 | FRIDAY DRAMA XX, EPISODE 1 |

# INFORMATION PROCESSING APPARATUS, INFORMATION PROCESSING METHOD, AND COMPUTER PROGRAM

CROSS-REFERENCE TO RELATED APPLICATIONS

The present application claims priority from Japanese Patent Application No. JP 2005-197876 filed on Jul. 6, 2005, the disclosure of which is hereby incorporated by reference herein.

BACKGROUND OF THE INVENTION

1. Field of the Invention

The present invention relates to an information processing apparatus, an information processing method, and a computer program and, more particularly, to an information processing apparatus, an information processing method, and a computer program capable of preferably supporting program viewing to a user by using electronic program guide (EPG) information.

2. Description of Related Art

Recently, a recording apparatus having a large-capacity hard disk has been provided. In addition, a recording apparatus having a function of automatically recording a program which matches with a user's preference based on the user's preference or a keyword by using EPG information of the program has also been provided (for example, see JP-A-2003-224798). A large-capacity recording apparatus having the automatic recording function can record and store a large number of programs. In addition, recently, a large number of programs have been provided through terrestrial broadcast, satellite broadcast, or cable television broadcast. Under the situation, there are a large number of programs which a user can view including recorded programs and currently broadcasted programs.

Rapid increase in the number of programs which the user can view provides advantages in that a wide selection range of the programs can be provided to the user. However, there is a problem in that searching for a program which the user desires to view among a large number of programs becomes a burden to the user.

Therefore, there is proposed an apparatus for providing a recommended program to the user based on the user's preference (for example, see JP-A-2005-56361).

However, even in the aforementioned apparatus, the user looks up a program table displayed on a screen and searches for a program which is recommended to the user. Therefore, in the apparatus, searching for the program which the user desires to view among a larger number of programs causes a burden to the user.

SUMMARY OF THE INVENTION

The invention is to provide an information processing apparatus, an information processing method, and a computer program capable of preferably supporting program viewing so that a user can easily search for a program which the user desires to view.

According to an aspect of the invention, there is provided an information processing apparatus including an EPG information recording unit which stores EPG information of programs; a program selection unit which selects programs corresponding to a plurality of different selection conditions based on the EPG information; and a display control unit which controls the display on a display screen of a plurality of selection buttons associated with the plurality of selection conditions in a manner that features of the selected programs are represented, wherein, when any one of the selection buttons is selected, the display control unit controls the display on the display screen of information corresponding to the program associated with the selected selection buttons.

The information of the program displayed on the display screen by the display control unit includes meta data such as a title of the program and the program itself (that is, data of contents constituting the program). According to this aspect of the invention, when the selection button is pushed, the information of the programs associated with the selection button is displayed on the display screen. The selection buttons are displayed in a manner that the features of the selected programs are represented. In addition, a plurality of the selection buttons associated with the different selection conditions are displayed on the multi-display screen. Therefore, the selection button where the feature is represented is selected according to the feature of the program which the user desires to view from among a plurality of the selection buttons, so that the information of the program which the user desires to view can be obtained. Namely, the user can search for the program which the user desires to view by simply selecting the selection button where the feature of the program is represented. As a result, according to this aspect of the invention, the user can easily search for the program which the user desires to view by performing a small number of manipulations.

The aforementioned EPG information may include EPG information of a currently broadcasted program, a to-be-broadcasted program, and/or a recorded program. Since the EPG information includes the EPG information of the currently broadcasted program, the information processing apparatus can display the information of the currently broadcasted program on the display screen. Since the EPG information includes the EPG information of the to-be-broadcasted program, the information processing apparatus can display the information of the to-be-broadcasted program on the display screen. Since the EPG information includes the EPG information of the recorded program, the information processing apparatus can display the information of the recorded program on the display screen. Since the EPG information includes the EPG information of the currently broadcasted program, the to-be-broadcasted program, and the recorded program, the information processing apparatus can display the information of the currently broadcasted program, the to-be-broadcasted program, and the recorded program on the display screen. As a result, the user can easily obtain the information of the currently broadcasted program, the to-be-broadcasted program, and the recorded program by performing such a simple manipulation as the selection of the selection buttons.

In addition, the display control unit may control the display in the display screen of the number of the programs selected based on the selection condition so as to correspond to the selection button associated with the selection condition. According to this construction, the user can see at a glance how many programs are selected based on the selection condition associated with each selection button.

In addition, the information of the selected program may include a program name of the selected program, and the display control unit may control the display of the information of the selected program (including the program name) on a portion of the display screen. According to this construction, the user can search for other programs while viewing the program output on the display screen. In addition, the user can search for the program while identifying the displayed program name.

In addition, when there are a plurality of programs selected by the program selection unit, the display control unit may control the display on the display screen of the information of any one of the programs. According to this construction, a space where the information of the program is displayed can be reduced in the display screen. Therefore, the user can search for the program while further clearly viewing the program output on the display screen.

In addition, when there are a plurality of programs selected by the program selection unit, the display control unit may control the array and display on the display screen of the information of all the selected programs.

In addition, the information processing apparatus may further include a rank allocation unit which allocates ranks to the selected programs based on a predetermined rule when there are a plurality of programs selected by the program selection unit, wherein the display control unit may control the display on the display screen of the ranks allocated to the selected programs together with the information of the selected programs.

In addition, the program selection unit may select a program having a predetermined program genre and a broadcast starting time in a predetermined range from a selection process time point based on any one of the selection conditions. The predetermined range may include a range prior to the selection process time point and a range after the selection process time point.

In addition, the program selection unit may select a program having a predetermined program genre and a program name including a predetermined keyword based on any one of the selection conditions. The predetermined genre may be the same genre as that of the program which the user is viewing at the time of the selection process.

In addition, the predetermined keyword may have substantially the same character sequence as that of a keyword included in the program name of the program viewed by the user at the time of the selection process.

In addition, the information processing apparatus may further include a preference information storage unit which stores information of a user's preference of programs, wherein the program selection unit may select programs based on the information of the user's preference by using any one of the selection conditions.

The information processing apparatus may further include a preference information storage unit which stores information of a user's preference of programs; and a viewing history information storage unit which stores a viewing history of programs, wherein the program selection unit may select a program based on the information of the user's preference and which has not been viewed based on the viewing history by using any one of the selection conditions. The not-viewed program may include a program which has not been viewed and a program which has been viewed but in a viewing time less than a predetermined time. In addition, the information of the user's preference may be generated based on the EPG information of the program for which a viewing frequency of the user is a predetermined value or more. According to this construction, a program which is frequently viewed by the user but which has not been viewed can be selected.

The information processing apparatus may further include a viewing history information storage unit which stores a viewing history of programs, wherein the program selection unit selects the programs based on the viewing history by using any one of selection conditions.

The viewing history may include time intervals when the user views the programs, and the program selection unit may select a program having a time when the user views the program which is longer than a broadcast time by using any one of the selection conditions.

According to another aspect of the invention, there is provided a computer program which allows a computer to function as an information processing apparatus. The computer program is stored in a storage unit included in the computer, and the computer program is read out by a CPU included in the computer to allow the computer to function as the information processing apparatus. In addition, a computer-readable recording medium which stores the computer program may be provided. The recording medium includes, for example, a magnetic disk and an optical disk.

According to still anther aspect of the invention, there is provided an information processing method including selecting programs corresponding to a plurality of different selection conditions based on EPG information of the programs; controlling the display on a display screen of a plurality of selection buttons associated with the plurality of selection conditions in a manner that features of the selected programs are represented; and when any one of the selection buttons is selected, controlling the display on the display screen of information corresponding to the program associated with the selected selection buttons.

The information processing method may further include, when any one of the selection buttons is selected, selecting the program corresponding to the selection condition based on the EPG information according to the selection condition associated with the selected selection button. According to this construction, when the selection button is pushed, the program is selected based on the selection condition corresponding to the selection button. Therefore, when the selection button is pushed, the program corresponding to the selection condition is selected and displayed on the display screen at the time of the pushing.

As described above, according to the aspects of the invention, it is possible to provide an information processing apparatus, an information processing method, and a computer program capable of preferably supporting program viewing so that a user can easily search for a program which the user desires to view.

BRIEF DESCRIPTION OF THE DRAWINGS

FIG. 4 is a view for explaining recorded program information according to the embodiment.

FIG. 5 is a view for explaining broadcast program information according to the embodiment.

FIG. 6 is a view for explaining preference information according to the embodiment.

FIG. 7 is a view for explaining an example of the preference information according to the embodiment.

FIG. 8 is a view for explaining another example of the preference information according to the embodiment.

FIG. 9 is a view for explaining still another example of the preference information according to the embodiment.

FIG. 10 is a view for explaining further still another example of the preference information according to the embodiment.

FIG. 11 is a view for explaining viewing history information according to the embodiment.

FIG. 12 is a view for explaining a viewing time table according to the embodiment.

FIG. 13 is a view for explaining a selection condition according to the embodiment.

FIG. 14 is a view for explaining a selection condition according to the embodiment.

FIG. 15 is a view for explaining an example of a program list according to the embodiment.

FIG. 16 is view for explaining another example of the program list according to the embodiment.

DETAILED DESCRIPTION

Figure 1:
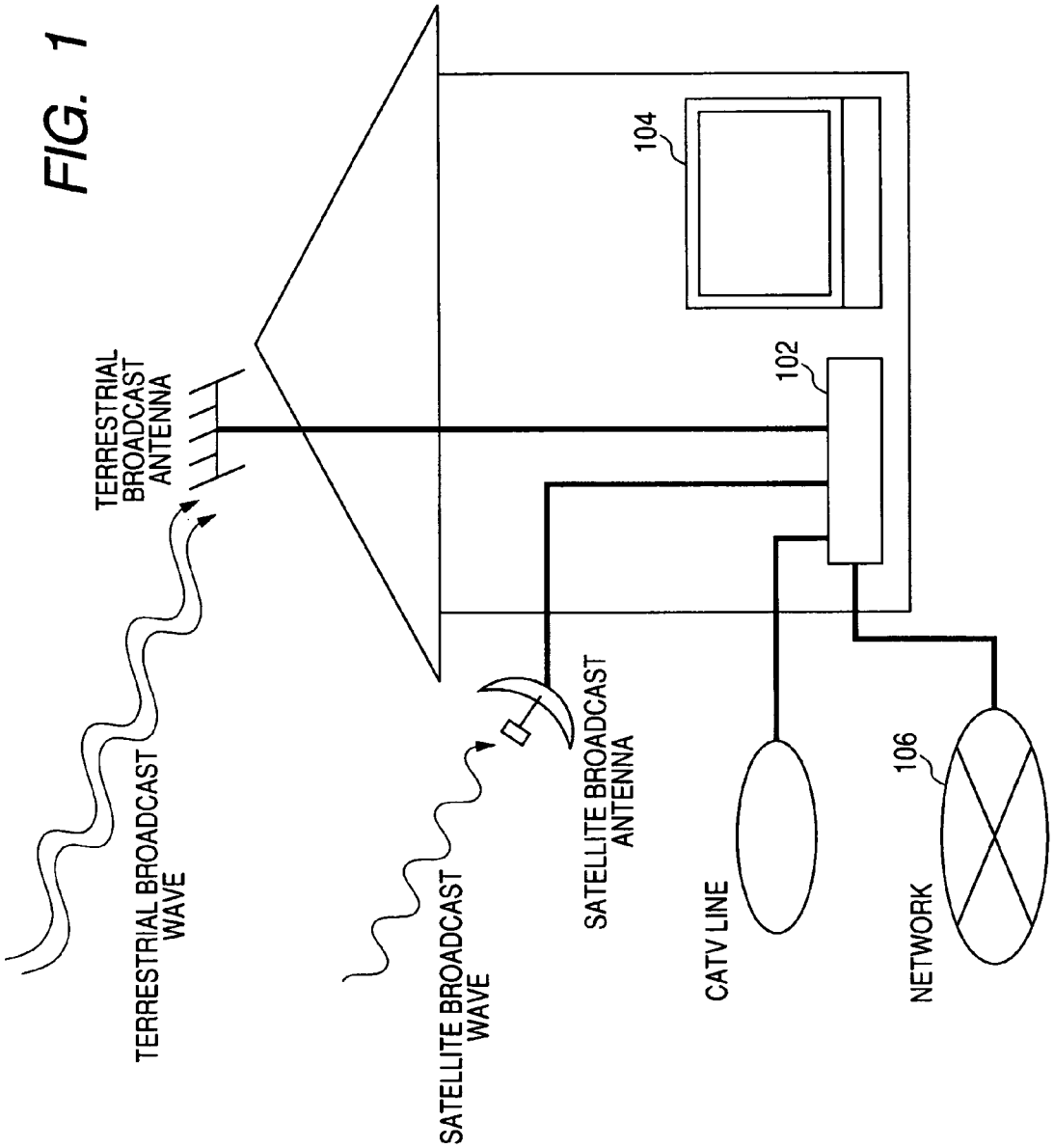
FIG. 1 is a view showing a whole construction of an embodiment of the invention.

Hereinafter, preferred embodiments of the invention will be described with reference to the accompanying drawings. In the specification and drawings, like reference numerals denote like elements having substantially the same functional constructions, and thus, description thereof is omitted.

Hereinafter, the information processing apparatus according to an embodiment of the invention will be described by exemplifying an information processing apparatus 102 capable of preferably supporting user's viewing of a program including a recorded program, an currently broadcasted program, and a to-be-broadcasted program by using EPG information.

Whole Construction

Firstly, a network system including the information processing apparatus 102 according to the embodiment is described with reference to FIG. 1. The information processing apparatus 102 receives a broadcast wave through a terrestrial broadcast antenna, a satellite broadcast antenna, and a CATV (cable television) line, stores a signal from demodulation of the broadcast wave in a built-in auxiliary storage device 120, and supplies the signal to a display device 104 to display the program. In addition, the information processing apparatus 102 is connected to a server through a network 106 to receive the EPG information from the server. The EPG information is data constituting an electronic program guide and includes information of IDs, titles, cast, channels, broadcast starting date and time, broadcast ending date and time, and genre of the to-be-broadcasted or currently broadcasted programs. The EPG information may be included in the aforementioned broadcast wave, or the information processing apparatus 102 may acquire the EPG information through the antennas or the lines. The information processing apparatus 102 may be an image recording/replaying apparatus such as a hard disk recorder and a DVD recorder. The display device 104 may be constructed with a television set, a monitor, or the like.

Hardware Construction of Information Processing Apparatus

Figure 2:
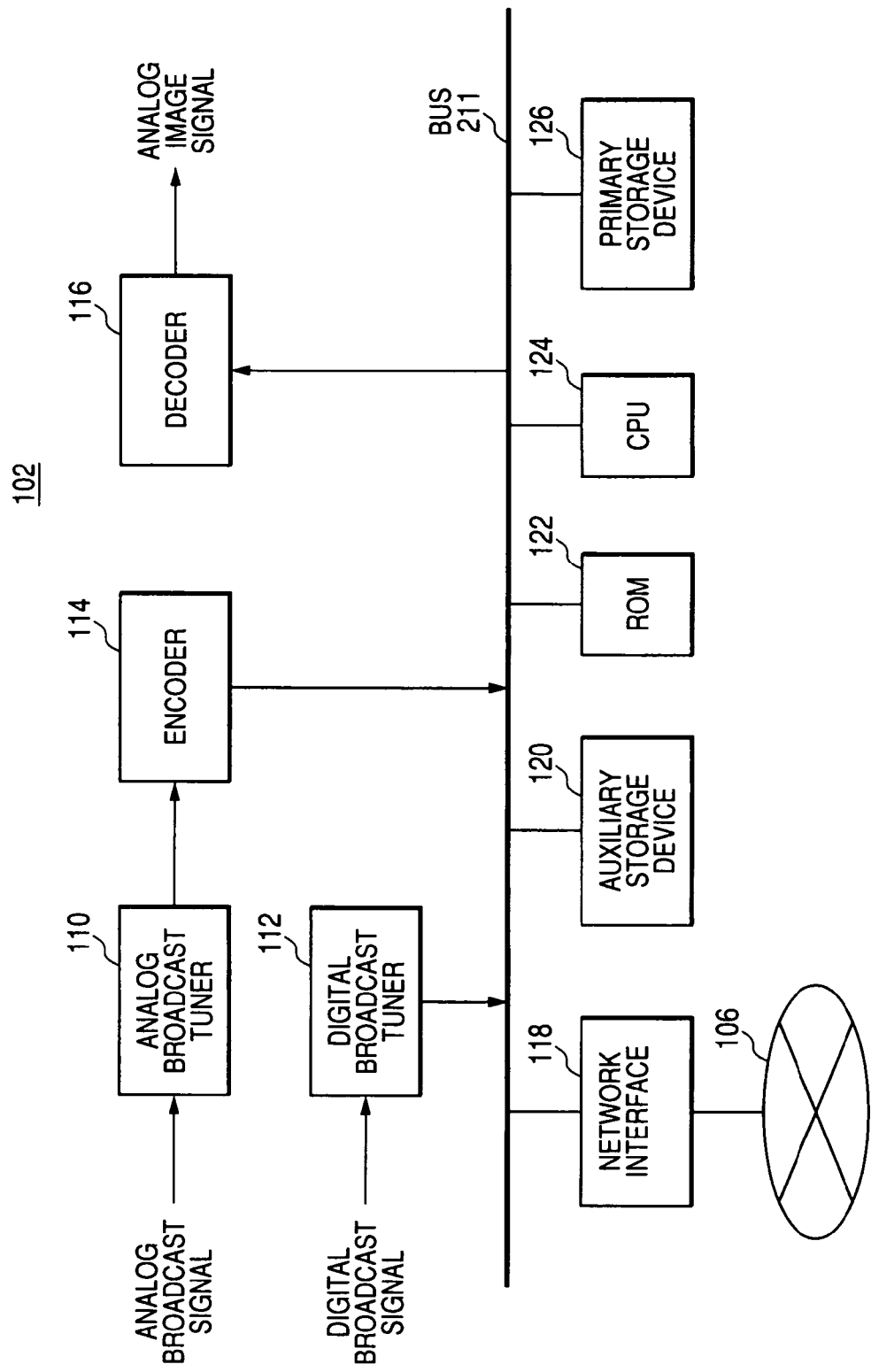
FIG. 2 is a block diagram showing a hardware construction of an information processing apparatus according to the embodiment.

Next, a hardware construction of the information processing apparatus 102 will be described with reference to FIG. 2. The information processing apparatus 102 mainly includes an analog broadcast tuner 110, a digital broadcast tuner 112, an encoder 114, a decoder 116, a network interface 118, an auxiliary storage device 120, a ROM 122, a CPU 124, and a primary storage device 126.

The analog broadcast tuner 110 demodulates analog terrestrial broadcast waves or satellite broadcast waves received through the antenna or cable television broadcast waves received through CATV lines and outputs image signal components and voice signal components to the encoder 114. When the EPG information is included in the broadcast wave, the analog broadcast tuner 110 extracts the EPG information and outputs the EPG information to the later-described EPG information acquisition unit 146.

The encoder 114 converts the image signal and the voice signal input from the analog broadcast tuner 110 into a digital image signal and a digital voice signal and supplies and stores the digital signals in the auxiliary storage device 120 through the bus 211.

The digital broadcast tuner 112 receives digital terrestrial broadcast waves or satellite broadcast waves through the antenna or digital cable television broadcast waves through the CATV lines and supplies and stores a digital image signal and a digital voice signal in the auxiliary storage device 120 through the bus 211. When the EPG information is included in the broadcast wave, the digital broadcast tuner 112 extracts the EPG information and outputs the later-described EPG information acquisition unit 146.

The network interface 118 is connected to the network 106 constructed with LAN or WAN. The network interface 118 acquires the EPG information or other information through the network 106 and stores the information in the auxiliary storage device 120 or the primary storage device 126.

The auxiliary storage device 120 includes storage medium such as a hard disk, a magnetic tape, a removable disk, and a flash memory. The auxiliary storage device 120 stores information supplied from the encoder 114, the digital broadcast tuner 112, the network interface 118, or the like.

The decoder 116 reads the digital image signal and the digital voice signal stored in the auxiliary storage device 120 to convert the digital signals into an analog image signal and an analog voice signal and outputs the analog signals to the display device 104.

The CPU 124 serves as an arithmetic process unit and a control unit and operates according to various programs stored in the ROM 122 or the auxiliary storage device 120 to control components in the information processing apparatus 102.

The ROM 122 stores programs or arithmetic parameters used by the CPU 124. In addition, the primary storage device 126 temporarily stores programs or data used to execute processes of the CPU 124 and parameters which are suitably changed in the execution. In addition, the primary storage device 126 may be used to temporarily store the EPG information or the like acquired by the information processing apparatus 102. The aforementioned components are connected to each other through the bus 211. Hereinbefore, the hardware construction of the information processing apparatus 102 is described.

Functional Construction of Information Processing Apparatus

Figure 3:
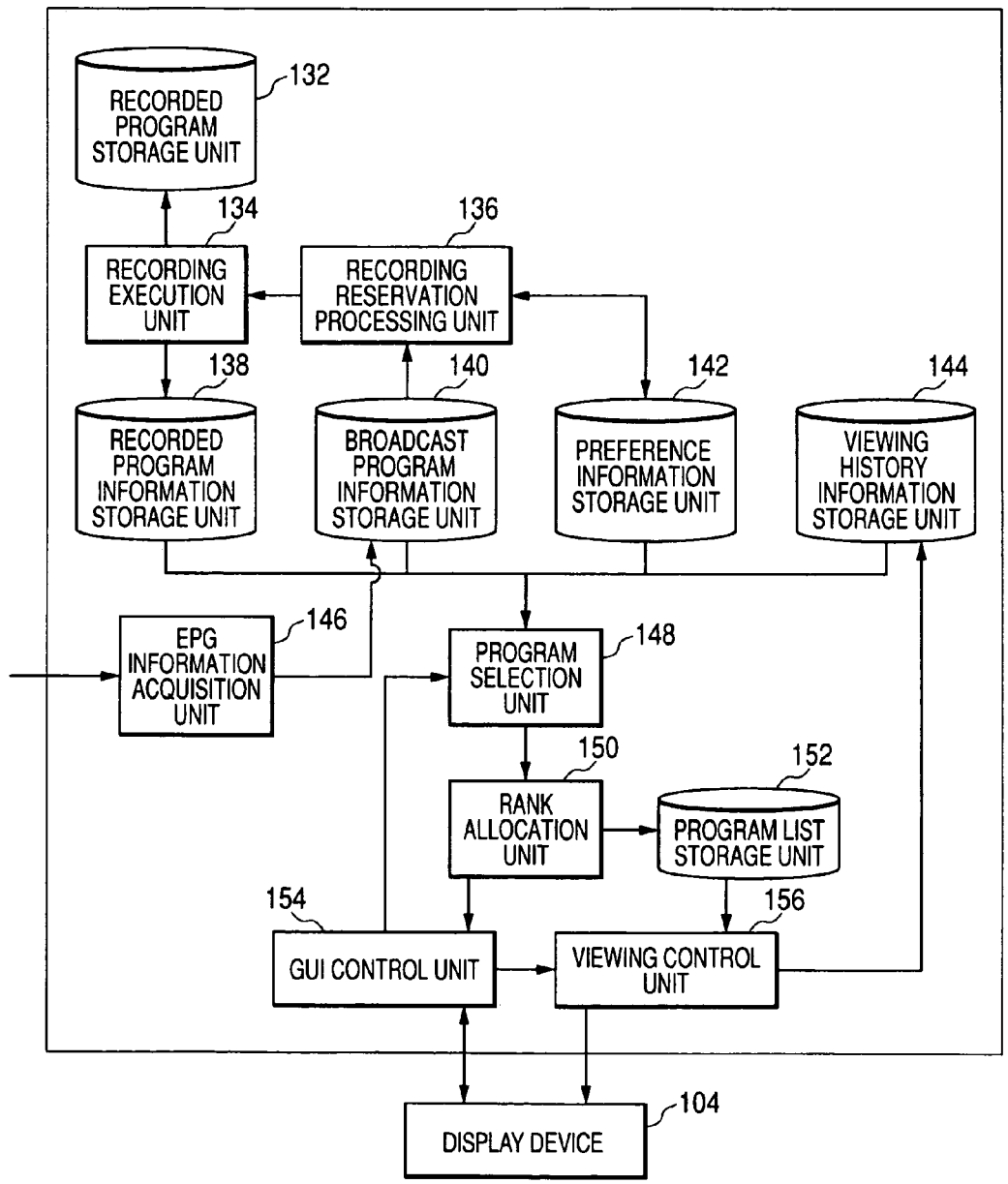
FIG. 3 is a block diagram showing a functional construction of the information processing apparatus according to the embodiment.

Next, a functional construction of the information processing apparatus 102 is described with reference to FIG. 3. The information processing apparatus 102 mainly includes a recorded program storage unit 132, a recording execution unit 134, a recording reservation processing unit 136, a recorded program information storage unit 138, a broadcast program information storage unit 140, a preference information storage unit 142, a viewing history information storage unit 144, an EPG information acquisition unit 146, a program selection unit 148, a rank allocation unit 150, a program list storage unit 152, a GUI control unit 154, and a viewing control unit 156.

The EPG information acquisition unit 146 acquires the EPG information from an external server connected to the network 106 through the network interface 118. When the EPG information is included in the broadcast wave, the EPG information is acquired from the analog broadcast tuner 110 or the digital broadcast tuner 112. The EPG information acquisition unit 146 supplies and stores the acquired EPG information in the broadcast program information storage unit 140. In addition, the EPG information acquisition unit 146 may supply the acquired EPG information or a portion thereof to the broadcast program information storage unit 140.

The broadcast program information storage unit 140 stores broadcast program information, that is, information of currently broadcasted and to-be-broadcasted programs. More specifically, the EPG information supplied from the EPG information acquisition unit 146 is stored. The broadcast program information storage unit 140 is an example of the EPG information storage unit and, particularly, stores the EPG information of the currently broadcasted program and the EPG information of the to-be-broadcasted program. Here, the broadcast program information stored in the broadcast program information storage unit 140 is described in detail with reference to FIG. 5.

FIG. 5 is a view showing an example of the broadcast program information. The broadcast program information includes information corresponding to items such as a broadcast program ID 222, a broadcast starting date and time 224, a broadcast ending date and time 226, a broadcast station 228, a channel 230, a genre 232, a title 234, and contents 236.

The broadcast program ID 222 is an identifier for uniquely identifying a broadcast program. In the example shown in the figure, the broadcast program ID is "00001A". "A" in the broadcast program ID denotes an ID of the broadcast program. The broadcast starting date and time 224 denotes a date and time when the program starts to be broadcasted, and the broadcast ending date and time 226 denotes a date and time when the program broadcasting is to end. The broadcast station 228 is a name of a broadcast station which delivers the program, and the channel 230 is an identifier of a channel through which the program is delivered. The genre 232 is a genre to which the program belongs. For example, as shown in the figure, one, two, or more genres among a plurality of genres such as news, sports, drama, variety, and documentary are stored as the genre of the program in the genre 232. The title 234 is a name of the program. A keyword showing contents of the program, and the like are stored in the contents 236. As the keyword, for example, cast names, texts representing contents, or other information for specifying the program are stored.

Returning to FIG. 3, the description is made. The recording reservation processing unit 136 reserves recording of a program. More specifically, the recording reservation processing unit 136 reserve recording of a program indicated by a user through an input device such as buttons and a remote controller included in the information processing apparatus 102. In addition, recording reservation processing unit 136 may search for a program corresponding to the EPG information including a keyword indicated by a user by using the EPG information of the to-be-broadcasted program stored in the broadcast program information storage unit 140 and reserve recording of the program. In addition, the recording reservation processing unit 136 may specify the program which is estimated to match with a user's preference based on the information of the user's preference stored in the preference information storage unit 142 by using the EPG information stored in the broadcast program information storage unit 140 and reserve recording of the associated program. In addition, when reserving the recording, the recording reservation processing unit 136 updates the contents stored in the preference information storage unit 142 based on the EPG information of the recording-reserved program. Namely, the preference information is updated so as for the user' preference of the title, genre, contents, or the like of the recording-reserved program to increase.

The preference information storage unit 142 stores information of user's preference of the program. Here, the preference information stored in the preference information storage unit 142 is described in detail with reference to FIGS. 6 to 10.

As shown in FIG. 6, the preference information of the user's preference of the program is stored as a plurality of items in the preference information storage unit 142. More specifically, the preference information includes title keyword preference information 242 representing a preference of a title of a program, keyword preference information 244 representing a preference of contents of a program, genre preference information 246 representing a preference of a genre of a program, and channel day time range preference information 248 representing a preference of a broadcasting time of a program.

As shown in FIG. 7, the title keyword preference information 242 represents a correspondence of a title keyword 252 to a preference degree 254. The title keyword 252 is a keyword included in the title of the program and corresponds to "title" of the EPG information. The preference degree 254 is a degree of a user's preference of the title keyword. The larger a value of the preference degree 254 is, the higher the preference degree is. The preference degree is updated by the recording reservation processing unit 136. More specifically, when the recording reservation processing unit 136 reserves the recording, the recording reservation processing unit 136 acquires the title 234 included in the broadcast program information of the associated program. Next, the recording reservation processing unit 136 searches for the text included in the title 234 from the title keyword preference information 242 of the preference information storage unit 142 and registers the search result as a keyword and increases the preference degree of the keyword by a predetermined point. Referring to the example shown in FIGS. 5 and 7, when the recording reservation processing unit 136 reserves the recording of the program having Program ID=00001A, the recording reservation processing unit 136 increases of the preference degree of the title keyword="News", "22" in the title keyword preference information 242 by a predetermined point. According to the construction, it is possible to increase of the preference degree of the title of the program having a high recording reservation frequency. In addition to the method of increasing the preference degree of the recording-reserved program in the example, a method of increasing the preference degree based on a user's input of the preference information or increasing the preference degree of the replayed recorded program may be considered.

In addition to the information of the user's preference generated based on the EPG information of the aforementioned recording-reserved program, preference information generated based on the EPG information of programs having a user's viewing frequency above a predetermined value may be stored in the preference information storage unit 142. More specifically, the preference information may be generated based on an occurrence frequency of a title of a program included in a viewing history stored in the later-described viewing history information storage unit 144 according to the occurrence frequency thereof. Alternatively, the reference information may be generated based on the EPG information of the programs which the later-described viewing control unit 156 output to the display device 104.

As shown in FIG. 8, the genre preference information 246 represents a correspondence of a genre 256 and the preference degree 254. The genre 256 is a genre which a program belongs to and corresponds to "genre" of the EPG information. The preference degree 254 is a degree of a user's preference of the genre of the program. The larger a value of the preference degree 254 is, the higher the preference degree is. The preference degree can be updated by using the same method as that in the title keyword preference information 242.

As shown in FIG. 9, the keyword preference information 244 represents a correspondence of a keyword 258 and the preference degree 254. The keyword 258 is a keyword associated with contents of a program and corresponds to "contents" of the EPG information. The preference degree 254 is a degree of a user's preference of the keyword. The larger a value of the preference degree 254 is, the higher the preference degree is. The preference degree can be updated by using the same method as that in the title keyword preference information 242.

As shown in FIG. 10, the channel day time range preference information 248 represents a correspondence of a channel day time range 260 and the preference degree 254. The channel day time range 260 is a broadcast time of a program and corresponds to "broadcast starting date and time" and "channel" of the EPG information. The preference degree 254 is a degree of a user's preference of the channel day time range. The larger a value of the preference degree 254 is, the higher the preference degree is. The preference degree can be updated by using the same method as that in the title keyword preference information 242.

Returning to FIG. 3, the description is made. The program reserved by the recording reservation processing unit 136 is recorded by the recording execution unit 134. The recording execution unit 134 records the associated program and stores data thereof in the recorded program storage unit 132. In addition, the recording execution unit 134 stores the information of the recorded program in the recorded program information storage unit 138 based on the EPG information of the recording-executed program.

The recorded program information storage unit 138 stores the information of the recorded program, that is, the recorded program information. More specifically, the EPG information supplied from the recording execution unit 134 is stored. The recorded program information storage unit 138 is an example of the EPG information storage unit and, particularly, stores the EPG information of the recorded program. Here, the recorded program information stored in the recorded program information storage unit 138 is described in detail with reference to FIG. 4.

FIG. 4 is a view showing an example of the recorded program information. Similar to the broadcast program information, the recorded program information includes information corresponding to items such as a recorded program ID 202, a broadcast starting date and time 204, a broadcast ending date and time 206, a broadcast station 210, a channel 212, a genre 214, a title 216, and contents 218. In addition, the recorded program information further includes a viewing situation 208.

The recorded program ID 202 is an identifier for uniquely identifying a recorded program. In the example shown in the figure, the recorded program ID is "0000R". "R" in the recorded program ID denotes an ID of the recorded program. The broadcast starting date and time 204, the broadcast ending date and time 206, the broadcast station 210, the channel 212, genre 214, the title 216, and the contents 218 are the same as the items included in the broadcast program information, and thus, the description thereof is omitted. In the viewing situation 208, information representing whether or not a program is viewed is stored. Whether or not a program is viewed is determined, for example, according to a predetermined time or more when the recorded program corresponding to the recorded program ID is replayed. The predetermined time may be set to, for example, 1 minute, 5 minutes, or 50% or more of a broadcast time interval of the recorded program. According to whether or not the program is viewed, for example as shown in the figure, "not viewed" or "viewed" is stored in the viewing situation 208.

Returning to FIG. 3, the description is made. The viewing history information storage unit 144 stores a viewing history of a program. FIG. 11 shows an example of the viewing history. As shown in the figure, the viewing history information storage unit 144 stores the program ID 262 and the title 264 of the program which the user viewed in a predetermined time or more. The program ID 262 includes a broadcast program ID and a recorded program ID. The viewing history information storage unit 144 may store information of programs so that a viewing sequence of the programs can be seen. For example, the information of the programs may be stored according to the viewing sequence, or the viewing ending date and time of the programs may be stored. In addition, information of the channels and the broadcast starting date and time may be stored.

As shown in FIG. 12, the viewing history information storage unit 144 may include a viewing time table 270 for storing a viewing time of each viewed program. More specifically, as shown in FIG. 12, the program ID 272, the broadcast time interval 274, and the total viewing time 276 of the program which is viewed in a predetermined time or more may be stored in associated with each other. The broadcast time interval 274 denotes a broadcast time calculated from the information of "broadcast ending date and time" and "broadcast starting date and time" included in the EPG information of the program corresponding to the program ID 272. The total viewing time 276 denotes a total time when the program corresponding to the program ID 272 is viewed. More specifically, the viewing time of the broadcast program is a sum of time when the broadcast program is output to the display device 104, and the viewing time of the recorded program is a sum of time when the recorded program is replayed. Since the broadcast time interval and the total viewing time of the program are stored in the viewing history information storage unit 144, the program can be selected based on a ratio of the total viewing time to the broadcast time interval of the program as described later.

Returning to FIG. 3, the description is made. The program selection unit 148 selects programs corresponding to a plurality of different selection conditions based on the EPG information. More specifically, the program selection unit 148 selects a program by using any one or more among the EPG information of the recorded program in the recorded program information storage unit 138, and the EPG information of the currently broadcasted program stored in the broadcast program information storage unit 140, and the EPG information of the to-be-broadcasted program stored in the broadcast program information storage unit 140. Although various selection conditions may be considered, seven selection conditions are exemplified in the embodiment. The program selection unit 148 selects programs corresponding to the seven selection conditions. Now, the selection conditions are described with reference to FIGS. 13 and 14.

FIG. 13 is a view for explaining information of a program selected based on the selection conditions according to the embodiment, and FIG. 14 is a view for explaining the selection conditions. As shown in FIG. 13, names representing the features of the program selected based on the selection conditions as a viewing style are allocated to the selection conditions. Now, the selection conditions are described in detail.

The selection condition allocated with the viewing style "Hot" is a selection condition for selecting the newest or relatively new information program. More specifically, the program selected based on the selection condition "Hot" is a program which belongs to a predetermined genre such as news and sports and of which broadcast starting time is in a predetermined range including a range prior to a selection process time point and a range posterior to the selection process time point. As shown in FIG. 14, when the program selection unit 148 selects the program according to the selection condition "Hot", the program is searched for in the broadcast program information storage unit 140 and the recorded program information storage unit 138 by using the genre and the broadcast starting date and time as a search key. Namely, the program selection unit 148 selects the program by determining whether or not the genre included in the EPG information is news or sports and whether or not the broadcast starting date and time included in the EPG information is in a predetermined range posterior to a selection time point or in a predetermined range prior to the selection time point based on the EPG information of the program stored in the broadcast program information storage unit 140 and recorded program information storage unit 138.

The selection condition allocated with the viewing style "Link" is a selection condition for selecting a program similar to the currently viewed program. More specifically, the program selected based on the selection condition "Link" is a program which belongs to a predetermined genre and of which program name includes a predetermined keyword. The predetermined genre is a genre the same as that of the currently viewed program. The predetermined keyword has a substantially the same character sequence as that of the keyword included in the program name of the currently viewed program. Similarly, as shown in FIG. 14, when the program selection unit 148 selects the program based on the selection condition "Link", the program is searched for in the broadcast program information storage unit 140 and the recorded program information storage unit 138 by using the genre and the title as a search key. Namely, the program selection unit 148 selects the program of which genre included in the EPG information is the same as that of the program viewed at the selection time point and of which keyword included in the title in the EPG information is the same as the keyword included in the title of the program viewed at the selection time point based on the EPG information of the program stored in the broadcast program information storage unit 140 and the recorded program information storage unit 139.

The selection condition allocated with the viewing style "New" is a selection condition for selecting a program which is frequently viewed but not viewed by the user. More specifically, the program selected based on the selection condition "New" is a program which has a high degree of a user's preference but is not viewed. Particularly, when the program which matches with the user's preference is selected according to the preference information generated based on the EPG information of the program of which viewing frequency is higher than a predetermined value, the program which is frequently viewed by the user can be selected. When the program which is frequently viewed by the user is selected, it is determined whether or not the program is not viewed with reference to the viewing history information storage unit 144. If the ID of the selected program is stored in the viewing history information storage unit 144, the program is determined to be viewed. If the ID of the selected program is not stored, the program is determined not to be viewed. As shown in FIG. 14, when the program selection unit 148 selects the program based on the selection condition "New", the program is searched for in the preference information storage unit 142, the broadcast program information storage unit 140, the recorded program information storage unit 138, and the viewing history information storage unit 144 by using the preference degree and whether or not the program is viewed as a search key. Namely, the program selection unit 148 selects the program which is estimated to match with the user's preference from the broadcast program information storage unit 140 and the recorded program information storage unit 138 with reference to the information of the user's preference stored in the preference information storage unit 142. More specifically, the program selection unit 148 extracts an item to which a high degree of preference is set from any one or more among the genre preference information, the title keyword preference information, the keyword preference information, and the channel day time preference information. Next, the program selection unit 148 selects the program of which EPG information includes the extracted item having a high degree of preference with reference to the EPG information of the programs stored in the broadcast program information storage unit 140 and the recorded program information storage unit 138. Next, the program selection unit 148 determines whether or not the ID of the selected program is stored in the viewing history information storage unit 144 and selects the program having the ID which is not stored. In addition, with respect to the program selected from the recorded program information storage unit 138, the program of which viewing situation is "not viewed" may be selected with reference to the viewing situation included in the EPG information of the program. In addition, even in case of an item to which a high degree of preference is not set, a program of which EPG information includes the item to which a degree of preference having a predetermined value or an average value or more is set may be selected.

The selection condition allocated with the viewing style "Past" is a section condition for selecting the program which has a viewing history. More specifically, the program selected based on the selection condition "Past" is a program which is viewed in a predetermined time or more before a selection time point (1 minute or more in the example of FIG. 13). As shown in FIG. 14, when the program selection unit 148 selects the program based on the selection condition "Past", the program is searched for in the viewing history information storage unit 144. Namely, the program detection unit 148 selects the program corresponding to the program ID stored in the viewing history information storage unit 144.

The selection condition allocated with the viewing style "Best" is a selection condition for selecting a user's favorite program. More specifically, the program selected based on the selection condition "Best" is a program of which degree of a user's preference is high. As shown in FIG. 14, when the program selection unit 148 selects the program based on the selection condition "Best", the program is searched for in the preference information storage unit 142, the broadcast program information storage unit 140, and the recorded program information storage unit 138 by using the preference degree as a search key. Namely, the program selection unit 148 extracts the program which is estimated to match with the user's preference from the broadcast program information storage unit 140 and the recorded program information storage unit 138 with reference to the information of the user's preference stored in the preference information storage unit 142. More specifically, the program selection unit 148 extracts an item to which a high degree of preference is set from any one or more among the genre preference information, the title keyword preference information, the keyword preference information, and the channel day time preference information. Next, the program selection unit 148 selects the program of which EPG information includes the extracted item having a high degree of preference with reference to the EPG information of the programs stored in the broadcast program information storage unit 140 and the recorded program information storage unit 138.

The selection condition allocated with the viewing style "Freq" is a selection condition for selection the program which is viewed for a long time by the user. More specifically, the program selected based on the selection condition "Freq" is a program of which total viewing time/broadcast time interval is a predetermined value or more and, in other words, a program of which user's viewing time is longer than the broadcast time interval of the program. As shown in FIG. 14, when the program selection unit 148 selects the program based on the selection condition "Freq", the program is searched for in the viewing time table 270 of the viewing history information storage unit 144 by using the viewing time and the broadcast time interval as a search key. Namely, the program selection unit 148 selects the program of which total viewing time/broadcast time interval is a predetermined value or more based on the broadcast time intervals and the total viewing time of the programs stored in the viewing time table 270. Alternatively, a predetermined number of programs may be sequentially selected in a descending order from the program having the largest value of the total viewing time/broadcast time interval.

The selection condition allocated with the viewing style "Shelf" is a selection condition for selecting the program of which previous recording remains in the user's memory. More specifically, the program selected based on the selection condition "Shelf" is a program having an old recording date among the recorded programs. The program selection unit 148 may select a predetermined number of programs among the programs having an old recording data at random or in a time order from the oldest program. As shown in FIG. 14, when the program selection unit 148 selects the program based on the selection condition "Shelf", the program is searched for in the recorded program information storage unit 138 by using the broadcast starting date and time as a search key. Namely, the program selection unit 148 selects the program of which EPG information includes the broadcast starting date and time which precedes a predetermined range or more before the selection time point with reference to the EPG information of the programs stored in the recorded program information storage unit 138. In addition, the programs are sorted in a time order from the oldest broadcast starting date and time based on the broadcast starting date and time included in the EPG information. Next, a predetermined number of programs in the time order from the oldest broadcast starting date and time are selected.

Hereinbefore, the selection condition used for the program selection unit 148 is described in detail. In addition, the selection condition is not limited to the aforementioned example, but it may be arbitrarily set. Returning to FIG. 3, the functional construction of the information processing apparatus 102 continues to be described. The rank allocation unit 150 allocates ranks to the programs selected by the program selection unit 148. More specifically, the rank allocation unit 150 acquires the EPG information of a plurality of the programs selected based on any selection condition from the program selection unit 148 and sorts the programs by using a predetermined sort key according to the selection condition to allocate the ranks to the programs. Now, an example of allocating the ranks according to the selection conditions is described.

In a case where there are a plurality of programs selected based on the selection condition which are allocated with the viewing style "Hot", "Link", or "New", the rank allocation unit 150 sorts the programs by using the broadcast starting date and time as a sort key. More specifically, the rank allocation unit 150 allocates a high rank to the currently broadcast program, allocates the next rank to the to-be-broadcasted program, and allocates the next rank to the recorded program based on the broadcast starting date and time of the programs. The program of which broadcast starting date and time is near to the selection time point among the currently broadcasted programs is allocated with a high rank. The program of which broadcast starting date and time is near to the selection time point among the to-be-broadcasted programs is allocated with a high rank. The program of which broadcast starting date and time is near to the selection time point among the recorded programs is allocated with a high rank. In addition, in a case where there are programs having the same rank, the program of which preference degree is higher is allocated with a higher rank by using the preference information as a second sort key.

In a case where there are a plurality of the programs selected based on the selection conditions allocated with the viewing style "Past", the rank allocation unit 150 sorts the programs in a viewing time order from the viewing time nearest to the selection time point. More specifically, the information of the programs are read out in a storage order of the programs stored in the viewing history information storage unit 144, the programs having the newest viewing history is allocated with the first rank, and the following program is allocated with the next highest rank in an order of newness. According to the construction, the first rank is allocated to the program viewed by the user just before the program which the user views at the selection time point.

In a case where there are a plurality of the programs selected based on the selection conditions allocated with the viewing style "Best", the rank allocation unit 150 sorts the programs in a preference degree order from the highest degree of the user's preference. In addition, the programs may be sorted in the same order as that of the selection condition allocated with "New".

In a case where there are a plurality of the programs selected based on the selection conditions allocated with the viewing style "Freq", the rank allocation unit 150 sorts the programs in a total viewing time/broadcast time interval order from the largest value of the total viewing time/broadcast time interval. A plurality of the programs selected based on the selection conditional located with "Shelf" are sorted, for example, in a time order from the oldest broadcast starting date and time. In addition, the invention is not limited to the aforementioned example, but the programs may be sorted in an order different from the aforementioned order to be allocated with ranks.

The rank allocation unit 150 allocates ranks to the EPG information of the programs acquired from the program selection unit 148 and, after that, stores the EPG information of the programs as a program list in the program list storage unit 152. FIGS. 15 and 16 show examples of the program list stored in the program list storage unit 152. FIG. 15 shows a program list of the programs selected based on the selection condition allocated with the viewing style "Hot" and allocated with the ranks by the rank allocation unit 150. As shown in FIG. 15, information of the programs corresponding to the items such as a rank 302, a program ID 304, a channel 306, a broadcast starting date and time 308, and a title 310 is stored in the program list. The rank 302 is a rank allocated to the programs by the rank allocation unit 150. The program ID 304 to the title 310 are information extracted from the EPG information of the programs. An example of the aforementioned allocated ranks is described with reference to FIG. 15.

The time point when the program corresponding to the program list shown in FIG. 15 is selected is assumed to be, for example, 2005/6/24 22:15. Since the currently broadcasted programs are allocated with a higher rank, the first and second rank programs are the currently broadcasted programs. Since the program of which broadcast starting date and time is nearest to selection time point is allocated with a high rank, the first rank is allocated to the program of which broadcast starts at 22:00 which is 15 minutes before the selection time point, and the second rank is allocated to the program of which broadcast starts at 21:30 which is 45 minutes before the selection time point. Next to the currently broadcasted programs, the ranks are allocated to the to-be-broadcasted program, so that third and fourth ranks are allocated to the to-be-broadcasted programs. Since the program of which broadcast starting date and time is nearest to selection time point is allocated with a high rank, the third rank is allocated to the program of which broadcast starts at 22:30 which is 15 minutes after the selection time point, and the fourth rank is allocated to the program of which broadcast starts at 22:40 which is 25 minutes after the selection time point. Next to the to-be-broadcasted programs, the fifth and sixth ranks are allocated to the recorded programs. Among the recorded programs, since the program of which broadcast starting date and time is nearest to selection time point is allocated with a high rank, the fifth rank is allocated to the program of which broadcast starts and is recorded at 18:30 which is 3 hours and 45 minutes before the selection time point, and the sixth rank is allocated to the program of which broadcast starts and is recorded at 12:00 which is 10 hours and 15 minutes before the selection time point.

FIG. 16 shows a program list of programs selected based on the selection condition allocated with the viewing style "Link" and allocated with the ranks by the rank allocation unit 150. Similar to the selection condition "Hot" shown in FIG. 15, the information of the programs corresponding to the items such as a rank 302, a program ID 304, a channel 306, a broadcast starting date and time 308, and a title 310 is stored in the program list corresponding to the selection condition "Link". Similar to the description with reference to FIG. 15, the ranks are allocated to the programs in an order of the currently broadcasted program, the to-be-broadcasted program, and the recorded program and in a broadcast starting time order from the program having the broadcast starting time nearest to the selection time point.

Figure 17:
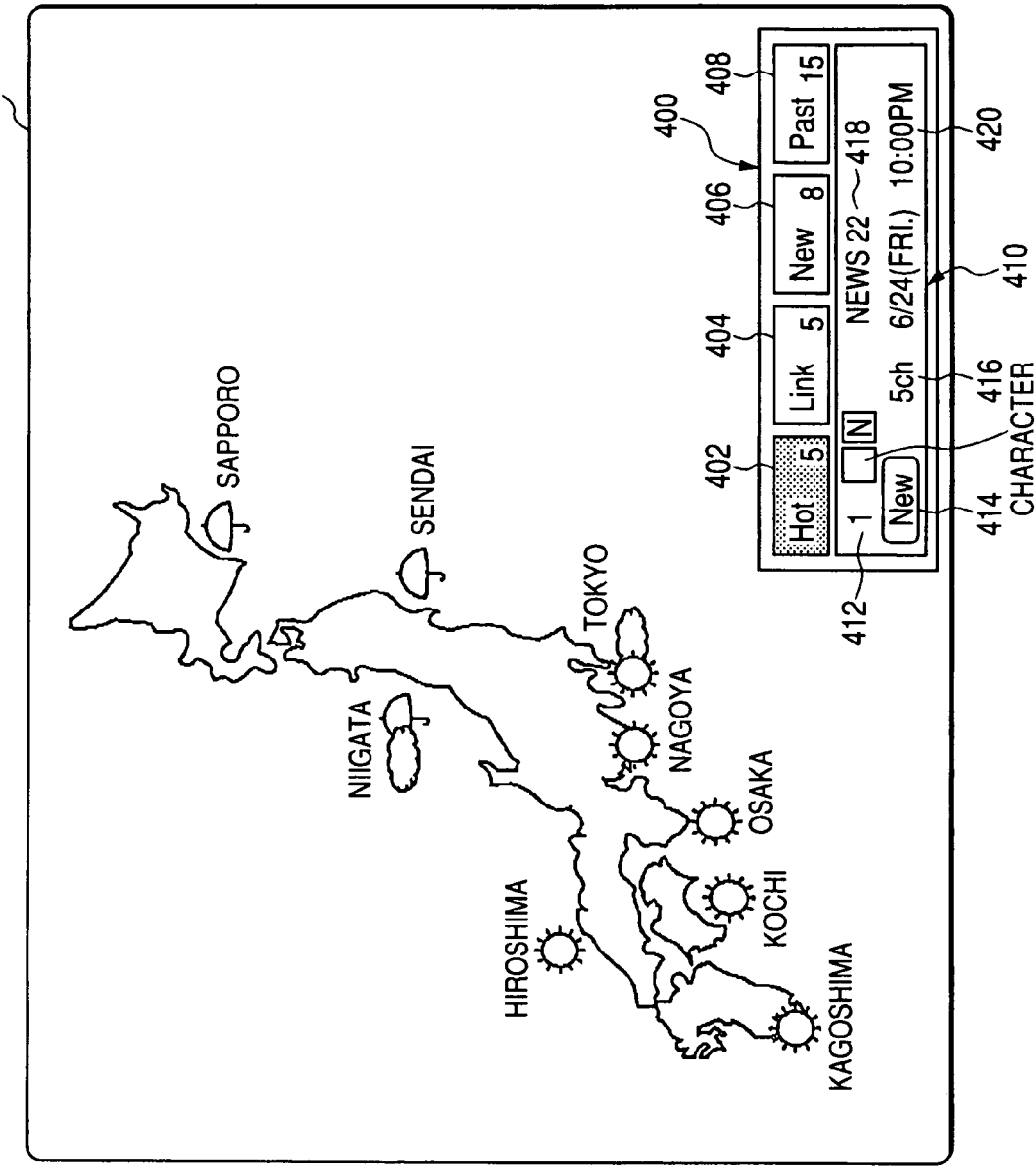
FIG. 17 is a view for explaining an example of a viewing supporting window displayed on a display screen according to the embodiment.

Returning to FIG. 3, the functional construction of the information processing apparatus 102 continues to be described. The GUI (Graphical User Interface) control unit 154 is an example of the display control unit and displays a plurality of the selection buttons corresponding to a plurality of the selection conditions on the display screen of the display device 104 in a manner that features of the programs selected based on the selection conditions are represented. When any one of the selection buttons is selected, the GUI control unit 154 displays on the display screen the information of the program selected based on the selection condition corresponding to the selected selection button. In addition, the GUI control unit 154 may display on the display screen the number of programs selected based on the selection conditions so as to correspond to the selection buttons associated with the selection conditions. In addition, the program name of the program may be included in the information of the program displayed on the display screen, and the GUI control unit 154 may display the information including the program name on a part of the display screen. In addition, where a plurality of programs are selected by the program selection unit 148, the GUI control unit 154 may display on the display screen the information of any one of the programs. In addition, the GUI control unit 154 may display on the display screen the rank allocated to the program together with the information of the program. FIG. 17 shows examples of the selection buttons and the information of the program displayed on the display screen by the GUI control unit 154.

The program is displayed on the display screen of the display device 104. In the example, the viewing supporting window 400 including the selection buttons 402, 404, 406, and 408 and the program information display area 410 is displayed on a portion of the display screen, that is, a lower right side of the display screen. Each selection button corresponds to each selection condition. The aforementioned viewing style is displayed on the selection buttons so as to indicate features of the programs selected according to the selection conditions corresponding to the selection buttons. In addition, the number of programs selected according to the selection conditions corresponding to the selection buttons is displayed on the selection buttons. According to the example shown in the figure, the selection button 402 is associated with the selection conditions for selecting the newest or relatively new information program and indicated with the viewing style "Hot" as a name representing the feature of the program. There are five programs selected according to the selection condition allocated with the viewing style "Hot", which is represented by the numeral in the selection button 402. The GUI control unit 154 can display on the selection buttons the numerals representing the number of programs based on the number of programs included in the program list with respect to the selection conditions stored in the program list storage unit 152.

The number of programs may be changed according to a user's manipulation. More specifically, for example, six programs are assumed to be included in the program list of the program selected according to the selection condition "Hot". When the user views the program by using a selection button other than the selection button "Hot", the number of programs included in the program list, that is, "6" is displayed on the selection button "Hot". On the other hand, when the user views the program by using a selection button of "Hot", that is, when the user views any one of the programs included in the program list corresponding to the "Hot", "5" which is obtained by subtracting the number of the currently viewed programs from the number of programs included in the program list corresponding to "Hot" may be displayed on the selection button "Hot". In addition, the GUI control unit 154 may always display the same number of the programs on the selection button according to the selection condition. For example, in case of the selection condition "Past", since the program is selected based on the viewing history, a predetermined number of programs can be always selected. For the reason, by maintaining the program list in a state that a predetermined number of programs are always included therein, the GUI control unit 154 can always display a predetermined number (in the shown example, 15) on the selection button of "Past". When the user views the program by using the selection button of "Past", that is, when the user views any one of the programs included in the program list corresponding to "Past", the selection of programs is performed again, and the program viewed just before is allowed to be included in the program list so as for the number of programs included in the program list to be a predetermined number.

In addition, in the shown example, four selection buttons are displayed. However, a larger or smaller number of the selection buttons may be displayed. Alternatively, according to a user's input, the current window may be converted into another window where other selection buttons (for example, a selection button displayed with the viewing style name other than the aforementioned viewing style name) are displayed.

As shown in the figure, for example, a rank 412, a program name 418, a program information icon 414, a channel 416, a broadcast starting date and time 420, and the like are displayed on the program information display area 410. The information is displayed on the program information display area 410 based on the program list stored in the program list storage unit 152. In the example of FIG. 17, the information of the programs is displayed based on the program list corresponding to the selection condition "Hot" shown in FIG. 15. The information currently displayed on the program information display area 410 is the information of the program having the first rank in the program list of FIG. 15, and the information of the programs, that is, rank=1, channel=Ch 5, program name=News 22, broadcast starting date and time=6/24 (Fri.) 10:00 PM are displayed. The program information icon 414 can display an icon representing additional information of the program, and in the shown example, "New" representing that the user does not view the displayed program is displayed. The information may be stored in, for example, the program list storage unit 152.

The GUI control unit 154 displays the information on the viewing supporting window 400 in response to an indication of the user through an input device such as buttons and a remote controller. For example, a remote controller having four focus position moving buttons of up, down, left, and right arrow buttons and a decision button is described. In response to the pushing of the left and right arrow buttons, the GUI control unit 154 moves the focus position between the selection buttons 402, 404, 406, and 408 to align the focus with the selected selection button. Next, in the state, when the decision button is pushed, the GUI control unit 154 moves the focus to the program information display area 410. Next, the GUI control unit 154 displays the information of the program on the program information display area 410 according to the selection button which is aligned with the focus at the time of pushing the decision button based on the program list including the programs selected according to the selection condition associated with the selected selection button (hereinafter, the pushing of the decision button in a state that the focus is aligned with the selection button is referred to as pushing of the selection button). At this time, for example, the information of the program having the first rank among the programs included in the program list is displayed.

In addition, the GUI control unit 154 changes the program displayed on the program information display area 410 in response to pushing of the up and down arrow buttons. More specifically, the information of the programs included in the program list is sequentially displayed in the rank order. For example, in a case where the GUI control unit 154 displays the information of the programs having the first rank included in the program list corresponding to the current selection condition "Hot" on the program information display area 410, when the down arrow button is pushed, the GUI control unit 154 displays the information of the program having the second rank included in the same program list on the program information display area 410. Next, when the down arrow button is pushed, the GUI control unit 154 displays the program having the third rank included in the same program list. In this state, when the up arrow button in pushed, the GUI control unit 154 displays the program having the second rank included in the same program list.

Next, in a state that the focus is aligned with the program information display area 410, when the decision button is pushed, the GUI control unit 154 supplies the information of the program displayed on the program information area 410 at the time of pushing the decision button to the viewing control unit 156. Next, the program output on the display screen of the display device 104 is converted to the program displayed on the program information area 410 at the time of pushing the decision button by the viewing control unit 156.

According to the aforementioned viewing supporting window 400, since the viewing supporting window 400 is displayed on a portion of the display screen of the display device 104, the user can obtain information of other programs while viewing the program output on the display screen.

In addition, since the selection buttons associated with the selection conditions are displayed on the viewing supporting window 400 so as for the features of the programs selected according to the selection conditions to be seen, the user can conveniently search for the program by selecting the selection button according to the feature of the program which the user desires to view. In addition, in the aforementioned example, the viewing style names are displayed on the selection buttons to display the selection buttons on the display screen in a manner that the features of the programs selected based on the selection conditions are represented, but the invention is not limited to the example. For example, colors for implying the features of the programs selected based on the selection conditions (for example, red allocated to the condition for selecting the newest information program and blue allocated to the condition for selecting the program which is frequently viewed by the user but not viewed) may be allocated to the selection buttons so as to identify the selection buttons with the colors. Alternatively, various shapes may be provided on the selection buttons according to the selection conditions corresponding to the selection buttons.

In addition, according the aforementioned viewing supporting window 400, since the number of programs is displayed on the selection button, the user can see the number of programs which can be viewed with respect to the selection buttons at a glance. In addition, according to the aforementioned viewing supporting window 400, since the name of the program is displayed, the user can search for the program which the user desires to view while seeing the program name.

In the aforementioned example, the information of one program is displayed on the program information display area 410. However, the information of a plurality of the programs may be displayed. For example, the information of all the programs included in the program list may be arrayed and displayed. In addition, in response to the pushing of the selection buttons, the GUI control unit 154 may display the information of the programs based on a program list which is constructed in advance. In addition, with respect to some types of the selection buttons, when the selection button is pushed, the GUI control unit 154 notifies the pushing of the selection button to the program selection unit 148, and the information of the program may be displayed based on a program list constructed with the programs selected by the program selection unit 148 according to the notice. More specifically, for example, when the selection button 402 associated with the selection condition "Hot" is pushed, the newest information program at the time of the pushing is preferably displayed based on the time of pushing the selection button. Therefore, when the selection button 402 is pushed, the GUI control unit 154 may notify the pushing to the program selection'unit 148 to allow the program selection unit 148 to select the program. According to the construction, the programs displayed on the display screen can be changed in real time.

Hereinbefore, viewing supporting window 400 displayed on the display screen of the display device 104 by the GUI control unit 154 is described. Returning to FIG. 3, the functional construction of the information processing apparatus 102 continues to be described. As described above, the viewing control unit 156 acquires the information of the program selected by the user from the GUI control unit 154 and outputs the program (data of contents constituting the program) on the display screen of the display device 104 and a voice output device such as a speaker. In addition, the viewing control unit 156 acquires the EPG information of the output program from, for example, the program list storage unit 152 and writes the EPG information in the viewing history information storage unit 144 as viewing history information.

Hereinbefore, the functional construction of the information processing apparatus 102 is described. Hereinafter, procedures of an information process performed by the information processing apparatus 102 are described with reference to FIGS. 18 and 19.

Flow of Information Process

Figure 18:
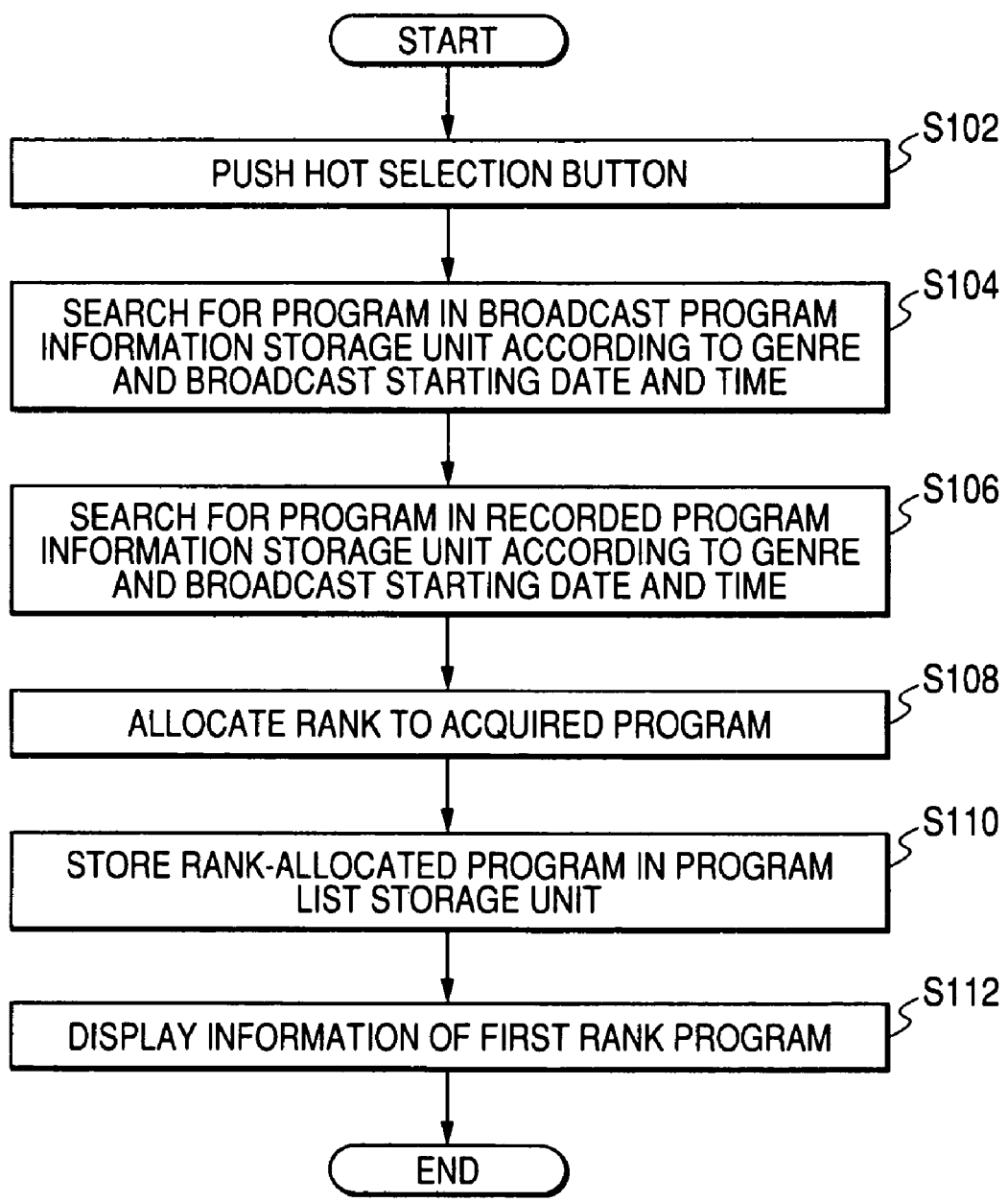
FIG. 18 is a flowchart showing a procedure of an information process according to the embodiment.
Figure 19:
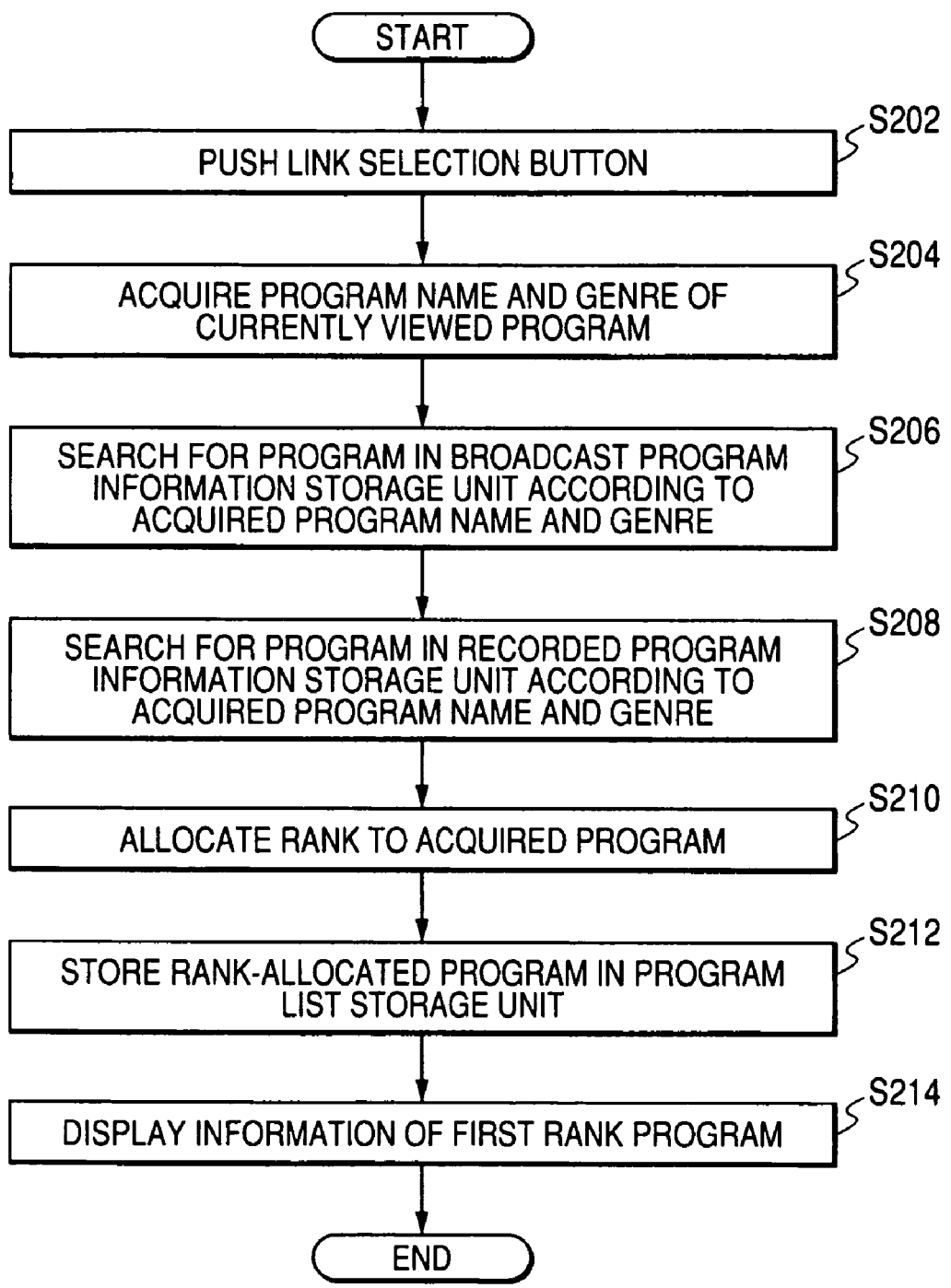
FIG. 19 is a flowchart showing a procedure of an information process according to the embodiment.

FIGS. 18 and 19 are flowcharts showing procedures performed by the information processing apparatus 102 when the selection buttons are pushed. FIG. 18 shows a procedure of an information process when a selection button where a viewing style "Hot" is displayed is pushed. Firstly, the selection button where the viewing style "Hot" is displayed is pushed (S102). The information processing apparatus 102 searches for a program in the broadcast program information storage unit 140 by using the genre and the broadcast starting date and time as a search key to extract the EPG information of the associated program (S104). In addition, the information processing apparatus 102 searches for a program in the recorded program information storage unit 138 by using the genre and the broadcast starting date and time as a search key to extract the EPG information of the associated program (S106). When the associated program is acquired, the information processing apparatus 102 allocates a rank to the acquired program (S108) and stores the rank-allocated program in the program list storage unit 152 (S110). Next, the information processing apparatus 102 displays information of a first rank program in the program list on the display device 104 (S112).

FIG. 19 shows a procedure of an information process when a selection button where a viewing style "Link" is displayed is pushed. Firstly, the selection button where the viewing style "Link" is displayed is pushed (S202). The information processing apparatus 102 acquires the program name and genre of the program which is displayed on the display device 104 when the selection button is pushed, that is, the program which the user currently views (S204). Next, the information processing apparatus 102 searches for a program in the broadcast program information storage unit 140 by using the acquired program name and the genre as a search key to extract the EPG information of the associated program (S206). In addition, the information processing apparatus 102 searches for a program in the recorded program information storage unit 138 by using the program name and the genre as a search key to extract the EPG information of the associated program (S208). When the associated program is acquired, the information processing apparatus 102 allocates a rank to the acquired program (S210) and stores the rank-allocated program in the program list storage unit 152 (S212). Next, the information processing apparatus 102 displays information of a first rank program in the program list on the display device 104 (S214).

When other selection buttons are pushed, the information processing apparatus 102 searches for a program in a searching-object storage unit by using a search key of each selection condition shown in FIG. 14 and performs acquiring of the associated program, storing of the program list, and displaying of the program information substantially similar to FIGS. 18 and 19. Hereinbefore, the procedures of the information process preformed by the information processing apparatus 102 according to the embodiment are described.

Hereinbefore, the information processing apparatus 102 according to the embodiment is described. According to the embodiment, a user can search for a to-be-viewed program by using the viewing supporting window 400 partially displayed on the display screen of the display device 104. Since the viewing supporting window 400 displays a plurality of the selection buttons corresponding to the selection conditions so as for the features of the program selected according to the selection conditions to be seen, the user pushes the selection buttons corresponding to the features of the to-be-viewed program to search for the program in a short time. In addition, according to the embodiment, the program can be searched in the broadcast program information storage unit 140 which stores the EPG information of the currently broadcasted program and the to-be-broadcasted program and in the recorded program information storage unit 138 which stores the EPG information of the recorded program, the user can select the to-be-viewed program from the displayed program information including the recorded program, the currently broadcasted program, and the to-be-broadcasted program. Therefore, the information processing apparatus 102 according to the embodiment can preferably support program viewing so as to allow the user to conveniently search for the to-be-viewed program among the recorded program, the currently broadcasted program, and the to-be-broadcasted program.

Hereinbefore, the preferred embodiments of the invention are described with reference to the accompanying drawings, but the invention is not limited thereto. It can be understood by the ordinarily skilled in the related art that various modifications are available in the scope of the invention disclosed in the claims, and these are also included in the scope of the invention.

For example, in the aforementioned embodiment, the selection process is performed on all of the currently broadcasted program, the to-be-broadcasted program, and the recorded program, but the invention is not limited thereto. For example, the program selection and the program information display may be performed on only the recorded program. Alternatively, the program selection and the program information display may be performed on only the currently broadcasted program or the to-be-broadcasted program.

In addition, in the aforementioned embodiment, the program displayed on the program information display area of the display screen is displayed on the display screen according to user's manipulation, but the invention is not limited thereto. For example, the program displayed on the program information display area of the display screen may be recorded according to the user's manipulation.

In addition, in the aforementioned embodiment, the information of the program names of the selected programs are sequentially displayed on the viewing supporting widow according to a user's input manipulation (in the embodiment, a user's manipulation of the up and down arrow buttons), and the program corresponding to the information displayed on the viewing supporting window is displayed on the display screen according to user's additional input manipulation (in the embodiment, a user's manipulation of the decision button). But, the invention is not limited thereto. For example, the selected programs may be sequentially output directly on the display screen according to a user's input manipulation (in the embodiment, the user's input manipulation of the up and down arrow buttons).

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processing apparatus, comprising:
 an electronic program guide (EPG) information recording unit which stores EPG information of a plurality of programs;
 a program selection unit which selects, for a given one of a plurality of selection conditions corresponding to a plurality of viewing styles, one or more of the plurality of programs having specific features which substantially match those associated with that selection condition, the selecting being based on electronic program guide (EPG) information of the plurality of programs, and which repeats such selecting for each one of the plurality of selection conditions so that one or more such programs are respectively associated with each selection condition,
 wherein the program selection comprising selecting, based on the given selection condition corresponding to a given viewing style, one or more databases for searching programs substantially matching one or more searching keys corresponding to the given viewing style,
 wherein in response to the given selection condition being programs having an old recording date, the program selection unit searches for recorded programs whose EPG information indicates a broadcast start date and start time which precede a particular date and time and then selects a predetermined number of such programs at random;
 a display control unit which controls display of, on a display screen, a plurality of selection buttons that correspond to the plurality of selection conditions,
 wherein, in response to one of the selection buttons being selected, the display control unit controls the display screen to display information regarding at least one of the one or more particular programs associated with the selection condition that corresponds to the selected selection button; and
 a rank allocation unit which allocates ranks to the programs selected for a given one of a plurality of selection conditions based on a corresponding predetermined rule for rank allocation when a plurality of programs are selected for the given selection condition by the program selection unit, wherein each viewing style corresponds to a different predetermined rule for rank allocation, wherein the display control unit controls the display screen to display a plurality of selection buttons corresponding to the plurality of selection conditions, and in response to one of the plurality of selection buttons being chosen, to display the ranks allocated to the programs selected for the selection condition corresponding to the chosen selection button together with the information of the selected programs.

2. The information processing apparatus according to claim 1, wherein the EPG information includes EPG information of a currently broadcast program, a to-be-broadcast program, and/or a recorded program.

3. The information processing apparatus according to claim 1, wherein the display control unit controls the display screen to display the number of the programs selected for each selection condition in correspondence with the selection button associated with that selection condition.

4. The information processing apparatus according to claim 1, wherein the information of each of the one or more selected programs includes a program name of that program, and the display control unit controls the display of the information of at least one of the one or more selected programs on a portion of the display screen.

5. The information processing apparatus according to claim 1, wherein when a plurality of programs are selected for a given selection condition by the program selection unit, the display control unit controls the display screen to display information of any one of the programs selected for that selection condition.

6. The information processing apparatus according to claim 1, wherein when a plurality of programs are selected for a given selection condition by the program selection unit, the display control unit controls an array of and display on the display screen of the information of all the selected programs.

7. The information processing apparatus according to claim 1, wherein the program selection unit selects a program having a predetermined program genre and a broadcast starting time in a predetermined range from a selection process time point based on any one of the selection conditions.

8. The information processing apparatus according to claim 1, wherein the program selection unit selects a program having a predetermined program genre and a program name including a predetermined keyword based on any one of the selection conditions.

9. The information processing apparatus according to claim 8, wherein the program name of a program viewed by the user at the time of the selection process includes a keyword having a character sequence, and the predetermined keyword has substantially the same character sequence as the keyword.

10. The information processing apparatus according to claim 1, further comprising a preference information storage unit which stores information of a user's preference of programs, wherein the program selection unit selects programs based on the information of the user's preference by using any one of the selection conditions.

11. The information processing apparatus according to claim 1, further comprising:
 a preference information storage unit which stores information of a user's preference of programs; and
 a viewing history information storage unit which stores a viewing history of programs,
 wherein the program selection unit selects a program based on the information of the user's preference and which has not been viewed based on the viewing history by using any one of the selection conditions.

12. The information processing apparatus according to claim 11, wherein the information of the user's preference is generated based on the EPG information of the programs for which a viewing frequency of the user is a predetermined value or more.

13. The information processing apparatus according to claim 1, further comprising a viewing history information storage unit which stores a viewing history of programs, wherein the program selection unit selects the programs based on the viewing history by using any one of selection conditions.

14. The information processing apparatus according to claim 13, wherein the viewing history includes time intervals when the user views the programs, and the program selection unit selects a program having a time when the user views the program which is longer than a broadcast time by using any one of the selection conditions.

15. A processor encoded with a computer program which allows an information processing apparatus to execute a process, the process comprising:

selecting, for a given one of a plurality of selection conditions corresponding to a plurality of viewing styles, one or more of the plurality of programs having specific features which substantially match those associated with that selection condition, the selecting being based on electronic program guide (EPG) information of the plurality of programs, wherein selecting one or more of the plurality of programs comprising selecting, based on the given selection condition corresponding to a given viewing style, one or more databases for searching programs substantially matching one or more searching keys corresponding to the given viewing style;

repeating the selecting step for each one of the plurality of selection conditions so that one or more such programs are respectively associated with each selection condition, wherein in response to the selection condition being programs having an old recording date, the selection step includes searching for recorded programs whose EPG information indicates a broadcast start date and start time which precede a particular date and time and then selecting a predetermined number of such programs at random;

controlling display of, on a display screen, a plurality of selection buttons that correspond to the plurality of selection conditions and, in response to one of the selection buttons being selected, controlling the display screen to display information regarding at least one of the one or more particular programs associated with the selection condition that corresponds to the selected selection button; and allocating ranks to the programs selected for a given one of a plurality of selection conditions based on a corresponding predetermined rule for rank allocation when a plurality of programs are selected for the given selection condition, wherein each viewing style corresponds to a different predetermined rule for rank allocation, wherein the display controlling step controls the display screen to display a plurality of selection buttons corresponding to the plurality of selection conditions, and in response to one of the plurality of selection buttons being chosen, to display the ranks allocated to the programs selected for the selection condition corresponding to the chosen selection button together with the information of the selected programs.

16. An information processing method, comprising:

selecting, for a given one of a plurality of selection conditions corresponding to a plurality of viewing styles, one or more of the plurality of programs having specific features which substantially match those associated with that selection condition, the selecting being based on electronic program guide (EPG) information of the plurality of programs, wherein selecting one or more of the plurality of programs comprising selecting, based on the given selection condition corresponding to a given viewing style, one or more databases for searching programs substantially matching one or more searching keys corresponding to the given viewing style;

repeating the selecting step for each one of the plurality of selection conditions so that one or more such programs are respectively associated with each selection condition, wherein in response to the selection condition being programs having an old recording date, the selection step includes searching for recorded programs whose EPG information indicates a broadcast start date and start time which precede a particular date and time and then selecting a predetermined number of such programs at random; and controlling display of, on a display screen, a plurality of selection buttons that correspond to the plurality of selection conditions;

in response to one of the selection buttons being selected, controlling the display screen to display information regarding at least one of the one or more particular programs associated with the selection condition that corresponds to the selected selection button; and allocating ranks to the programs selected for a given one of a plurality of selection conditions based on a corresponding predetermined rule for rank allocation when a plurality of programs are selected for the given selection condition, wherein each viewing style corresponds to a different predetermined rule for rank allocation, wherein the display controlling step controls the display screen to display a plurality of selection buttons corresponding to the plurality of selection conditions, and in response to one of the plurality of selection buttons being chosen, to display the ranks allocated to the programs selected for the selection condition corresponding to the chosen selection button together with the information of the selected programs.

17. The information processing method according to claim 16, further comprising, when any one of the selection buttons is selected, selecting the program corresponding to the selection condition based on the EPG information according to the selection condition associated with the selected selection button.

* * * * *